Aug. 26, 1969  F. GROBETY  3,462,886
APPARATUS FOR GRINDING DIAMOND OR HARD METAL
Filed March 27, 1967  2 Sheets-Sheet 1
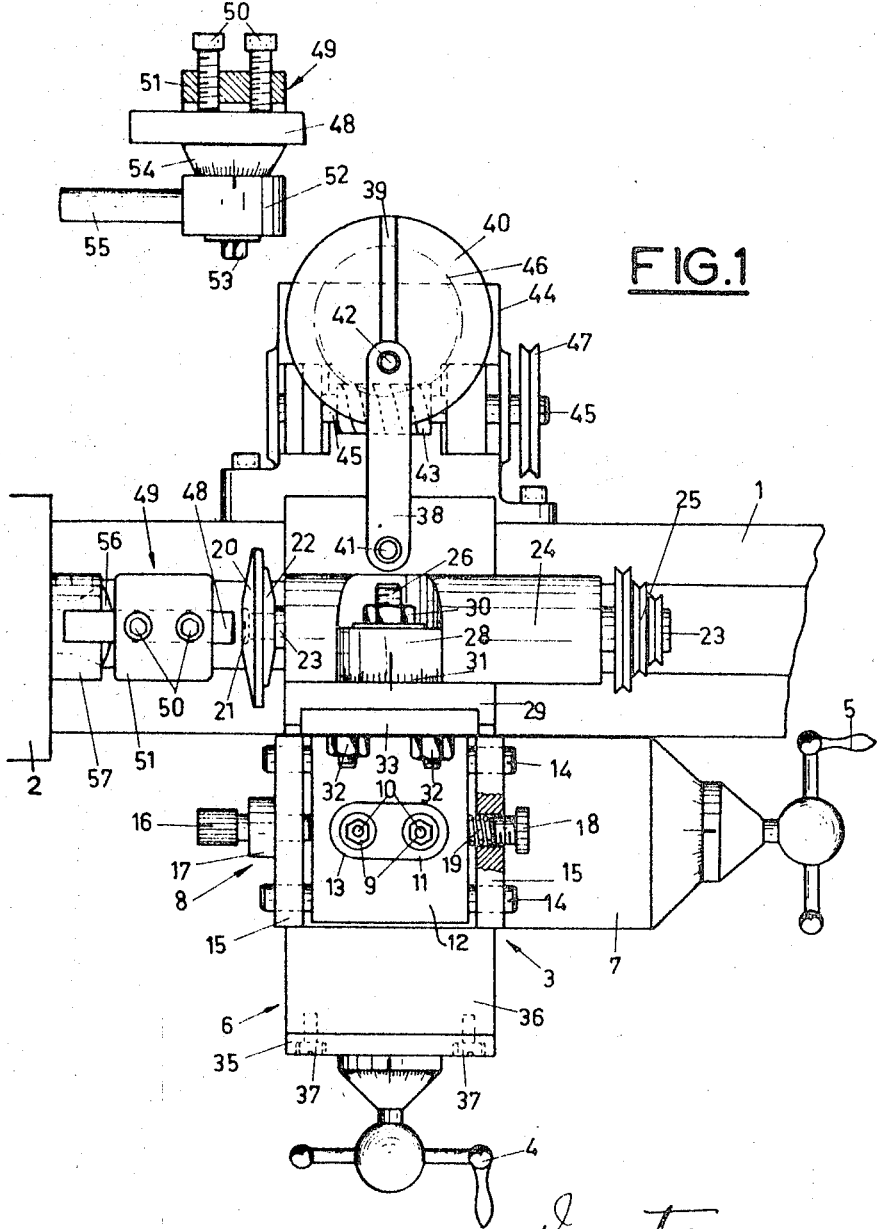
Inventor:
François Grobety
By Robert E. Burns
atty.

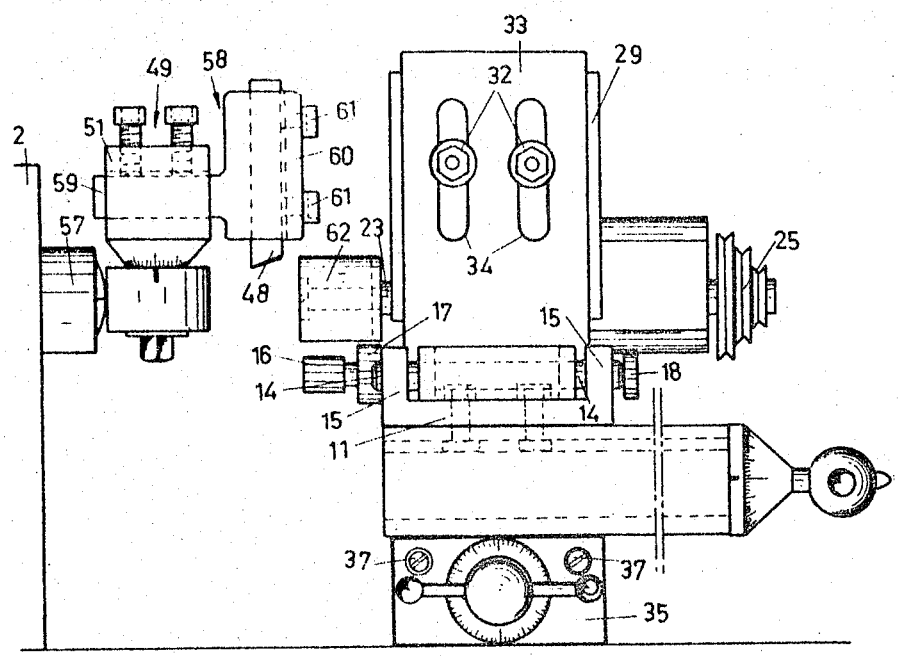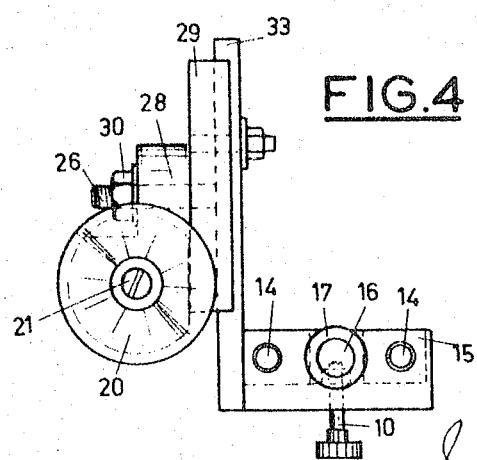

3,462,886
APPARATUS FOR GRINDING DIAMOND OR HARD METAL
Francois Grobety, Bienne, Switzerland, assignor to Cadral S.A., Bienne, Switzerland
Filed Mar. 27, 1967, Ser. No. 626,104
Claims priority, application Switzerland, Apr. 1, 1966, 4,882/66
Int. Cl. B24b 7/16, 9/16
U.S. Cl. 51—54        7 Claims

ABSTRACT OF THE DISCLOSURE

The present invention has for object a device for grinding diamond or hard metal comprising a frame having an adjustable support on which is secured a tool, a honing device driven by a motor; elastic means pressing extremity of this tool against the grinding wheel and wherein the grinding wheel has at least one working surface the angle of which respect to its axis of rotation is different from 90°, with means permitting to produce relative movements of a variable amplitude between the axis of the tool and the axis of the grinding wheel parallel to itself in a plane and wherein the extremity of the tool is constantly in contact with the active surface of the grinding wheel in such a way that the shape of this extremity varies in function of the amplitude given to these movements.

---

There are already known automatic machines for working diamond or hard metal.

In machines of this type known today, the diamond or other work piece is fixed on an adjustable support and ground by an abrasive flat disk rotatably driven. One known machine of this type gives a translational and oscillatory movement to the support for the work piece which is itself, driven in rotation, thereby permitting to obtain conical or spherical shapes. The support of the diamond is urged by an elastic force against the surface of the grinding wheel.

Another machine of this type provides a continuous movement of the diamond relative to the axis of rotation of the grinding wheel.

In all these machines the working surface of the grinding wheel is giving to the diamond a conical or spherical plane surface according to the movement given to the support.

When it is desired to sharpen a chisel shaped edge on such a machine, the cutting edges thus obtained are straight because the working surface of the wheel is flat. However it has been noted that during use of such chisel shaped metal sticks against the positive cutting edge of the chisel edge producing a scoring which mars the surface finish of the machine piece. Another severe flaw resides in the fact that the elastic pressure applying the extremity of the diamond against the grinding wheel produces vibrations when the support on which the diamond is secured is weak or has an insufficient mass. These vibrations originate on the one hand from the rippled surface of the rotatably driven grinding wheel passed against the extremity of the tool and from the driving motor of the grinding wheel. These vibrations alter the polish of the diamond or of the hard metal and since the use of a chisel shaped with a diamond is intended generally to bring the machined piece to a condition in which it has a polished surface, all flaws in the surface of the diamond are harmful to the quality of the machining.

Another factor to be considered is that of cost. Actually, machines known up to now are relatively large, possess an independent motor and are mounted on their own frames and not on the lathe. Owing to this, space is occupied by a relatively costly machine which is non-productive and only operates part-time, thereby limiting its use to large concerns.

The present invention has for its object a device which will obviate the above indicated limitations of prior art structures.

The accompanying drawings represent by way of example one device according to the invention.

FIGURE 1 shows in plan view a lathe on which is mounted a grinding attachment.

FIGURE 2 shows a cross-sectional view of the work holder of the grinding attachment.

FIGURE 3 shows a cross-sectional view of a second modification.

FIGURE 4 shows a view of a grinding wheel holder from the head stock end.

The device shown on FIGURE 1 is mounted on a lathe, such as one of the type habitually used for making tools.

This lathe consists of a bench 1, a head stock 2 and a carriage 3 with two handles 4 and 5 rigid with two micrometric screws not shown controlling the movement of the carriage along two perpendicular axes. The handle 4 controls the movement of slide 6 along an axis perpendicular to bench 1 and handle 5 controls the movement of slide 7 mounted on slide 6 along an axis parallel to bench 1. The grinding wheel holder 8 is secured on slide 7 by two securing nuts 9 which cooperate with screws 10 the heads of which are introduced in grooves not shown in slide 7. Nuts 9 bear on a U-shaped stationary base part 11 of the grinding wheel holder and pass through an elongated opening 13 in an adjustable tool holder 12 is mounted on the vertical rods 14 the extremities of which slide in two legs 15 of base with part 11. The leg 15 nearer the head stock 2 of the lathe carries an adjustable stop 16 with a lock nut 17 while a screw 18 through the other leg 15 presses a spring 19 against the adjustable holder 12 which is thus held against stop 16.

Grinding wheel 20 is secured by a screw 21 on a support 22 rigid with a shaft 23 rotatable in sleeve 24. Pulley block 25 is secured on shaft 23 for connection to a motor not shown. This sleeve 24 is rotatably secured on a vertical support 29 by a screw 26 which passes through a leg 28 rigid with a sleeve 24 and which screws in support 29 at one end, while a nut 30 is secured at the other extremity serves for blocking the sleeve 24 on support 29. This sleeve 24 can be angularly positioned round the axis formed by screw 26 and a graduation 31 engraved on the leg permits to define the inclination that it is desired to give to grinding wheel 20. The support for grinding wheel 20 is secured on adjustable tool holder 12 by the intermediary of two nuts 32 grasping support 29 against the vertical upright 33 made in one piece with the adjustable tool holder 12. This upright 33 has two elongated openings 34 permitting the height adjustment of the grinding wheel support 29.

The slide of carriage 6 is composed of two parts, a lower part 35 integral with the movement of the micrometric screw and an upper part 36 related to the lower part by a system of dovetailed slides not shown, two screws 37, blocking the upper part 36 on the lower part 35. It is thus possible to free in this manner the upper part and to make it slide freely on the lower part. For this purpose there is secured to the upper part 36 of slide 7 an arm 38 the other extremity of which is connected to a diametric groove 39 of a wheel 40 rotatable on support 44 secured to the bench of the lathe. This arm 38 is pivoted to the lathe of each securing member 41 and 42. An endless screw 43 rigid with shaft 45 rotatable in support 44 meshes with a toothed wheel 46 integral with wheel 40. A pulley 47 is secured to shaft 45 and is driven by means of a belt by a motor not shown.

Tool 48 the part to be worked of which might be a diamond or of hard metal is secured on a tool holder 49 by means of two screws 50. The head 51 of the tool holder is angularly adjustable on base 52 and blocked in the desired position by a nut 53, a graduation 54 permitting to define this position. Base 52 of the tool holder is provided with a stem 55 which is introduced in the base 56 of the lathe. Known means not shown permit to grasp stem 55 towards base 56 and to make rotating part 57 rigid with head stock 2 of the lathe.

FIGURE 3 shows the same device intended for another utilization and where tool 48 to be ground is secured perpendicular to the axis of head stock 2 of the lathe by a support 58 having two branches 59, 60, perpendicular one to the other. Branch 59 is secured as previously described on head 51 of tool-holder 49 and tool 48 is secured on branch 60 by means of two screws 61. Grinding wheel 62 is cylindrical.

The functioning of the apparatus shown on FIGURE 1 is as follows:

Tool 48 is secured on tool-holder 49 by means of screw 50, and head 51 is positioned angularly. The tool-holder can then be adjusted in a second position around the shaft of stem 55 by using an indexing system not shown placed on the head of the lathe. Once the position of the tool has been set, the inclination of sleeve 24 is adjusted around the axis of the securing screw 26 and this sleeve is then tightened on support 29 by means of nut 30. The two slides 6 and 7 are moved by handles 4 and 5 to bring the grinding wheel in front of tool 48. The upper part 36 of the carriage is freed by unscrewing screw 37, then the position of the extremity of arm 38 pivoted on disc 40 is adjusted by moving the securing member in groove 39 of this disc, defining in this manner the amplitude of movement of part 36 of the carriage and consequently of grinding wheel holder 8. This movement is selected as a function of the sharpness which it is desired to give to the positive cutting edge of the chisel shape and will thus be less than the length of this edge.

Once the adjusting operations are finished, the motor is started in order to drive shaft 23 of the grinding wheel and shaft 45 of the endless screw 43. Slide 7 of carriage 3 is advanced by handle 5 until grinding wheel 20 comes into contact with the extremity of tool 48. At this moment one checks to see that the stop screw 16 bears against the mobile base part 12 of the grinding wheel holder and slide 7 is advanced by the amount desired by reference to the graduation carried by handle 5. This operation causes the advance of part 11 of the grinding wheel holder secured to the carriage while mobile part 12 moves relatively to fixed part 11 against spring 19, going away from stop 16 by the distance defined by the movement of slide 7. At this moment, grinding wheel 29 driven by an alternating movement by arm 38 connected to groove 39, begins to sharpen the diamond or hard metal placed at the extremity of tool 48, pressed by the force of spring 19 until part 12 of the grinding wheel holder comes to bear against stop 16. The conical surface of grinding wheel 29 preferably forms an angle of between 70° to 80° with its rotational axis and the movement given to the upper part 36 of the slide is calculated in order to produce a cutting edge slightly concave having a radius of about 300 mm. The alternating movement of part 36 provokes very slight movement of the grinding wheel perpendicular to its axis which causes the sharpness given to the extremity of tool 48. This movement is made possible thanks to the elastic force of spring 19.

The utilization of the device shown on FIGURE 3 permits grinding of chisels having concave or convex shapes and the radius of which is small. In order to obtain this result the tool to be sharpened is placed on support 58 vertically to the axis of rotation of the grinding wheel 62 which has a cylindrical form. In this case part 36 can be immobilized by fixing it by screws 37 to the lower part 35 of slide 6 and by removing the driving belt of pulley 47 from axis 45 giving in this manner a zero amplitude to grinding wheel 62. The extremity of tool 48 is attached as previously described and the shape of the chisel corresponds then to the radius of grinding wheel 62. It is possible in this case to place the grinding wheel coaxially to the axis of rotation of the spindle of the lathe by means of support 29 and slides 6 and 7 and to turn the lathe spindle 57 in the head of the lathe in the chuck 56 of which tool-holder 49 is held. The spindle 57 of the head of the lathe is given a rotation in the opposite direction to that of grinding wheel 62 thus augmenting the cutting speed. It is evident that this grinding wheel can also be given an alternating movement by means of arm 38 as previously described and that the tool-holder 49 can be secured on the head of the lathe thus giving a different shape to the extremity of tool 48.

It is also possible to combine the alternating movement given to part 36 of slide 6 with the oscillation by a certain angle of the lathe spindle. This oscillatory movement is obtained manually and permits to obtain a convex surface in the cutter or chisel.

It is understood that arm 38 can be disconnected from part 36 of slide 6 and that movements can be effected manually by handle 4.

What is claimed is:

1. Apparatus for grinding diamond or hard metal comprising an adjustable support, a work piece secured on said support and having a given axis, a driven grinding wheel, elastic means for pressing said grinding wheel against the extremity of said work piece, said grinding wheel having a working surface at an angle with respect to the axis of rotation thereof which is different from 90°, means producing relative movements of variable amplitude between the axis of said work piece and said axis of said grinding wheel, perpendicular to the axis of the grinding wheel, said extremity of said work piece being constantly in contact with the active surface of the grinding wheel so that the shape of said extremity varies as a function of the value of the amplitude given to said movements.

2. Apparatus for grinding diamond or hard metal according to claim 1, wherein said grinding wheel is secured on a carriage of a lathe, said carriage and said means producing movements with variable amplitude act on said slide perpendicular to said bench of said lathe in such a way as to move said axis of said grinding wheel perpendicular to itself.

3. Apparatus for grinding diamond or hard metal according to claim 1, wherein said grinding wheel has a slide element and said elastic means pressing the extremity of said work piece against the grinding wheel act on said slide element.

4. Apparatus for grinding diamond or hard metal according to claim 2 wherein said means producing movements of variable amplitude are driven mechanically by a motor acting on a speed reducing system comprising a screw meshing with a wheel on which is pivoted essentrically an arm removably connected to a mobile part of said carriage.

5. Apparatus for grinding diamond or hard metal according to claim 1, wherein said grinding wheel is angularly adjustable about an axis perpendicular to its axis of rotation.

6. Apparatus for grinding diamond or hard metal according to claim 2, wherein said tool is secured on said adjustable support perpendicularly to the axis of rotation of the mobile part of the head of said lathe.

7. Apparatus for grinding diamond or hard metal according to claim 6, wherein said tool moves around the axis of rotation of the mobile part of the head of the lathe in a plane cutting the axis of rotation of said grinding wheel.

References Cited

UNITED STATES PATENTS 3,304,660  2/1967  Bindszus _____ 51—56

FOREIGN PATENTS 788,111  12/1957  Great Britain.
131,637  6/1929  Switzerland.

JAMES L. JONES, JR., Primary Examiner